United States Patent [19]

Müller

[11] Patent Number: 5,613,815

[45] Date of Patent: Mar. 25, 1997

[54] FASTENER AND PANEL ASSEMBLY AND METHOD OF MAKING SAME

[75] Inventor: Rudolph R. M. Müller, Frankfurt, Germany

[73] Assignee: Profil - Verbindungstechnik, Friedrichsdorf, Germany

[21] Appl. No.: 439,428

[22] Filed: May 11, 1995

Related U.S. Application Data

[60] Division of Ser. No. 343,724, Nov. 24, 1994, Pat. No. 5,528,812, which is a continuation-in-part of Ser. No. 241,206, May 11, 1994, Pat. No. 5,423,645, which is a division of Ser. No. 101,920, Aug. 4, 1993, Pat. No. 5,335,411, which is a continuation of Ser. No. 786,204, Oct. 31, 1991, Pat. No. 5,251,370.

[30] Foreign Application Priority Data

Mar. 25, 1994 [DE] Germany ............... 44 10 475.8

[51] Int. Cl.⁶ ............................. F16B 37/04; F16B 19/08
[52] U.S. Cl. ........................ 411/181; 411/179; 411/501
[58] Field of Search ...................... 411/179, 180, 411/181, 183, 107, 501; 29/432.1, 432.2

[56] References Cited

U.S. PATENT DOCUMENTS

| | | |
|---|---|---|
| 1,579,875 | 4/1926 | Lundberg . |
| 2,026,757 | 1/1936 | Swanstrom . |
| 2,415,695 | 2/1947 | Kann . |
| 2,466,811 | 4/1949 | Huck ......................... 411/501 X |
| 3,213,914 | 10/1965 | Baumle et al. . |
| 3,276,499 | 10/1966 | Reusser . |
| 3,461,936 | 8/1969 | Rosan, Sr. et al. . |
| 3,938,239 | 2/1976 | Lauth . |
| 3,967,669 | 7/1976 | Egner . |
| 4,018,257 | 4/1977 | Jack . |
| 4,557,650 | 12/1985 | Molina . |
| 4,627,776 | 12/1986 | Pamer et al. . |
| 4,711,021 | 12/1987 | Muller ......................... 411/179 X |
| 4,732,518 | 3/1988 | Toosky . |
| 4,810,143 | 3/1989 | Muller . |
| 4,831,698 | 5/1989 | Muller . |
| 4,893,394 | 1/1990 | Muller . |
| 5,207,588 | 5/1993 | Ladouceur et al. . |
| 5,237,733 | 8/1993 | Ladouceur et al. . |
| 5,251,370 | 10/1993 | Muller et al. . |

*Primary Examiner*—Neill R. Wilson
*Attorney, Agent, or Firm*—Howard & Howard

[57] ABSTRACT

A method of riveting a plurality of panels utilizing a fastener which may then be used to attach a further element to the panel assembly and wherein the fastener is first permanently attached to a first panel for a later attachment to a second or plurality of panels to form the fastener and panel assembly. The fastener is attached to the first panel by piercing a tubular barrel portion through the panel and affixing the first panel in an annular groove in a flange portion surrounding the barrel portion. The groove includes radial ribs preventing rotation of the fastener in the first panel and a radial rib is deformed in an outer surface of the barrel portion preventing pull-out of the fastener. The second and further panels are pre-pierced with a conical lip surrounding the panel opening and received on the barrel portion of the fastener with the conical lip facing the first panel. An annular recess is formed in the first panel which recedes the conical lip of the second panel and the free end of the barrel portion is deformed over the second panel, flattening the conical lip radially inwardly against the barrel portion, forming a secure mechanical interlock between the fastener and the panel assembly.

22 Claims, 5 Drawing Sheets

FASTENER AND PANEL ASSEMBLY AND METHOD OF MAKING SAME

RELATED APPLICATIONS

This application is a divisional application of U.S. patent application Ser. No. 08/343,724 filed Nov. 22, 1994, now U.S. Pat. No. 5,528,812, which is a continuation-in-part application of U.S. patent application Ser. No. 08/241,206 filed May 11, 1994, now U.S. Pat. No. 5,423,645, which application was a divisional application of Ser. No. 08/101,920, filed Aug. 4, 1993, now U.S. Pat. No. 5,335,411, which application was a continuation application of Ser. No. 07/786,204, filed Oct. 31,1991, now U.S. Pat. No. 5,251,370. This application also claims priority to German Application No. P4410475.8, filed Mar. 25, 1994.

FIELD OF THE INVENTION

This invention relates to an improved fastener and panel assembly, wherein the fastener is permanently attached to a plurality of panels retained in face-to-face relation and the fastener may then be utilized to retain a structural element to the panel assembly. The method of this invention is particularly adapted for mass production applications, such as automotive applications, requiring intimate contact between the panels, which may be relatively heavy gauge steel panels, and the fastener may be self-piercing and clinching.

BACKGROUND OF THE INVENTION

Self-attaching fasteners are now used extensively in mass production applications by the automotive and appliance industries, for example, to permanently attach a structural element to a panel, such as a metal bracket, frame member or body panel. U.S. Pat. Nos. 2,707,322 and 3,648,747 disclose pierce nuts which have been widely accepted by the automotive industry, wherein the pierce nut is permanently attached to a metal panel in a die press, and the press may also be utilized to form the metal panel into a contoured shape. A pierce nut is permanently installed in the metal panel with each stroke of the press, wherein the pilot portion of the pierce nut pierces a slug from the panel and the panel is then deformed into grooves provided in the body portion of the nut. U.S. Pat. Nos. 4,555,838 and 4,610,072 disclose improved fastening systems for permanently installing male and female fasteners in a panel in mass production applications. A fastener in such fastening systems include a tubular or annular barrel portion which is riveted to the panel during the installation. The tubular barrel portion may be utilized to pierce a slug from the panel, which is received in the tubular barrel portion as disclosed in U.S. Pat. No. 4,555,838, or a punch may be utilized to pre-pierce or simultaneously pierce the panel as disclosed, for example, in U.S. Pat. Nos. 4,711,021, 4,831,698 and 4,713,872. In recent years, the automotive industry, for example, has substantially reduced the weight of vehicles to improve fuel efficiency and the thickness of the metal panels and plates utilized by this industry has also been reduced. These fastener systems were designed, in part, to attach a fastener to thinner panels, including steel panels having a thickness of about 0.030 inches.

There is a need, however, for a fastener system for heavier gauge panels and fastener systems having improved torque resistance. The fastener system disclosed in the above-referenced co-pending application may be utilized with a broader range of panel thicknesses, including steel panels ranging in thickness from 0.75 mm to 4 mm.

There is also a need for a fastener system which attaches a plurality of panels in face-to-face relation which has not been met by the fastener systems disclosed in the above-referenced patents. At present, steel panel assemblies are typically attached by spot welding. A weld fastener is attached to one of the panels, forming a fastener and panel assembly. For example, the axle housing of an automobile may be attached to a U-shaped frame assembly which comprises two nested steel panels which are spot welded together. Holes are formed in the panels where the fasteners are required to attach the axle assembly to the frame and the fasteners are welded to the inside panel aligned with the holes. The frame assembly may then be dip coated with wax to reduce corrosion; however, the liquid wax wicks between the panels because the panels are not in intimate contact. When bolts are threaded into the weld nuts attached to one of the panels, the panels are compressed and the wax is extruded from between the panels. However, because the wax is viscous, it is extruded slowly and the bolts must be tightened several times to ensure a tight connection. Further, the welded fasteners may also be subject to failure under high torque loads.

The fastener and panel assembly of this invention may be utilized to attach a plurality of panels in intimate matting face-to-face relation such that wax, for example, will not wick between the panels and the fastener provides improved torque resistance. Further, the fastener is self-piercing, such that the fastener may be utilized in mass production applications in a die press. The method of this invention may also be used to interconnect two or more panels together in a conventional die press and provides improved pull-out and push-through resistance. Thus, the fastener and panel assembly of this invention provides important advantages over the prior art and fulfills a need which is not met by the present fastener assemblies.

SUMMARY OF THE INVENTION

The fastener and panel assembly of this invention includes a plurality of plastically deformable panels permanently retained in face-to-face relation and a fastener for attachment of other elements to the panel assembly. The fastener includes a barrel portion, preferably a tubular portion, which may be utilized to pierce an opening in the first panel, as described below in regard to the method of this invention. The fastener further includes a flange portion which extends radially from the barrel portion, generally perpendicular to the barrel portion, and a fastener portion generally opposite the barrel portion. Where the fastener is a female or nut-type fastener, the fastener may include a threaded bore which is coaxially aligned with the barrel portion or a smooth bore which receives a self-tapping or thread-rolling screw or bolt. Where the fastener is a male fastener, such as a stud or bolt fastener, the fastener portion extends from the flange portion coaxially aligned with the barrel portion. In the most preferred embodiments, the flange portion includes a groove adjacent the barrel portion which surrounds the barrel portion to provide a mechanical interlock between the fastener and the first panel.

The fastener and panel assembly of this invention further includes a first panel having an opening which receives the fastener barrel portion and the first panel bears against the fastener flange portion and is preferably deformed in the flange portion groove to retain the fastener to the first panel. In the most preferred embodiment, the outer surface of the barrel portion includes a radial annular rib spaced from the free end of the barrel portion which bears against the first panel, entrapping the first panel in the annular groove in the flange portion. As described below in regard to the method of this invention, the annular rib is preferably deformed from the barrel portion as the fastener is affixed to the first panel.

The fastener and panel assembly further includes a second panel having an opening which receives the barrel portion therethrough and the free end of the barrel portion is deformed radially outwardly over the second panel, permanently attaching the panels together in face-to-face relation with the fastener portion extending from the first panel to attach another element to the panel assembly, as described above. In the most preferred embodiment, the first panel includes an annular groove or recess which surrounds the barrel portion which is formed into the first panel as the panel is deformed into the annular groove of the flange portion of the fastener. The second and further panels are then deformed into the annular recess in the first panel, forming an intimate face-to-face contact between the panels secured by the fastener. The free end of the barrel portion is preferably deformed radially outwardly into an arcuate hook-shape over an edge of the second panel surrounding the second panel opening and the second panel is deformed radially inwardly against the barrel portion forming a very secure mechanical interlock between the fastener and the second panel.

The preferred method of attaching a plurality of panels together in face-to-face relation with a fastener of this invention includes locating a fastener opposite a first panel with the free end of the barrel portion facing the first panel. The method then includes driving the fastener barrel portion free end against the first panel, piercing an opening in the first panel, then driving the fastener barrel portion through the opening in the first panel and securing the fastener to the first panel. The method further includes forming an opening in a second panel configured to receive the barrel portion of the fastener, then locating the second panel on the first panel in face-to-face relation with the fastener barrel portion extending substantially through the second panel opening and finally deforming the fastener barrel portion radially outwardly to securely rivet the second panel to the first panel and mechanically affix the fastener to the panel assembly with the fastener extending from the first panel to attach further elements to the panel assembly. Two or more panels may be attached to the first panel by the method of this invention.

In many applications, it is preferable to securely retain the fastener to the first panel prior to receipt and securement of the second and further panels. In a mass production application, for example, the fastener may be attached to the first panel at one location, such as where the first panel is deformed into a configured shape. The fastener and first panel assembly is then moved to a second station where the fastener and first panel assembly is attached to a second panel. In mass production applications, the fastener and first panel assembly may be loaded into a bin with other assemblies and the fastener may become dislodged from the first panel unless the fastener is securely retained to the first panel. Further, as described above, the fastener may be subjected to torque loads in the panel assembly and thus the fastener must be provided with anti-rotation means in such applications. Thus, as described above, the fastener preferably includes an annular groove in the flange portion adjacent the barrel portion which surrounds the barrel portion. In the most preferred embodiment, the groove is generally V-shaped, extending radially inwardly toward the barrel portion and the groove includes a plurality of radial ribs which generally bridge the V-shaped groove. The method of this invention then includes deforming the first panel adjacent the panel opening into the annular groove in the flange portion forming a mechanical interlock between the first panel and the fastener, wherein the ribs prevent rotation of the fastener in the panel assembly. Further, an annular recess is preferably deformed in the first panel as the panel is deformed into the annular groove in the barrel portion and the second panel is deformed into the annular recess in the first panel, forming an intimate face-to-face relation between the first and second panels, preventing entry of foreign material between the panels, including the wax coating which may be applied to the panel assembly.

In a preferred method of this invention, the second panel is deformed in the assembly process, preferably as the opening is formed in the second panel, by forming a generally conical or frusto-conical lip surrounding the opening in the second panel having a free circular edge spaced from the plane of the second panel. The method then includes locating the second panel on the first panel with the frusto-conical lip bearing against the first panel. The method then includes flattening the conical lip radially inwardly against the barrel portion of the fastener as the free end of the barrel portion is deformed radially outwardly to permanently secure the panel assembly. If additional panels are attached over the second panel, the additional panels are preferably deformed to provide a frusto-conical lip surrounding the panel opening, as described.

Where two or more panels are attached by the fastener, the panels may be pierced and formed simultaneously. The panels are preferably retained in face-to-face relation, such as by spot welding, then pierced and deformed adjacent the pierced opening to form a frusto-conical lip surrounding the opening in both panels. The fastener barrel portion is then located in the pierced panel opening with the frusto-conical lip facing the radial flange. The frusto-conical lip is then driven against the first panel, flattening the conical lip of the panels, deforming the lips radially inwardly against the exterior surface of the barrel and the free end of the barrel is simultaneously deformed radially outwardly over the last panel, forming a secure mechanical interlock between the fastener and panel assembly.

The barrel portion of the most preferred embodiment of the fastener includes a first portion having a diameter adjacent the free end of the barrel portion which is less than a second larger diameter portion adjacent the flange portion, defining a radial shoulder at the junction between the first and second portions. The antirotation ribs may extend from the groove into the second larger diameter portion, providing improved torque resistance for the fastener and panel assembly. The method of this invention then includes driving the barrel portion through the panel opening to receive the second larger diameter portion of the barrel portion in the panel opening. Where the panel opening is pierced by the barrel portion, the barrel portion preferably includes an outer edge which pierces an opening in the panel having a diameter generally equal to the first smaller diameter portion of the barrel portion. Where the panel is prepierced, the diameter of the panel opening is preferably less than the diameter of the second larger portion of the barrel portion. The radial shoulder is then deformed radially outwardly forming a radial rib against the first panel, entrapping the first panel in the groove or recess in the flange portion. Thus, the fastener is securely retained on the first panel prior to receipt of the second panel, which is desirable in mass production applications for the reasons set forth above.

The fastener and panel assembly and method of this invention will be more fully understood from the following description of the preferred embodiments, appended claims and drawings, a brief description of which is set forth below.

DETAILED DESCRIPTION OF THE PREFERRED EMBODIMENTS OF THE INVENTION

Figures 1, 2, 3:
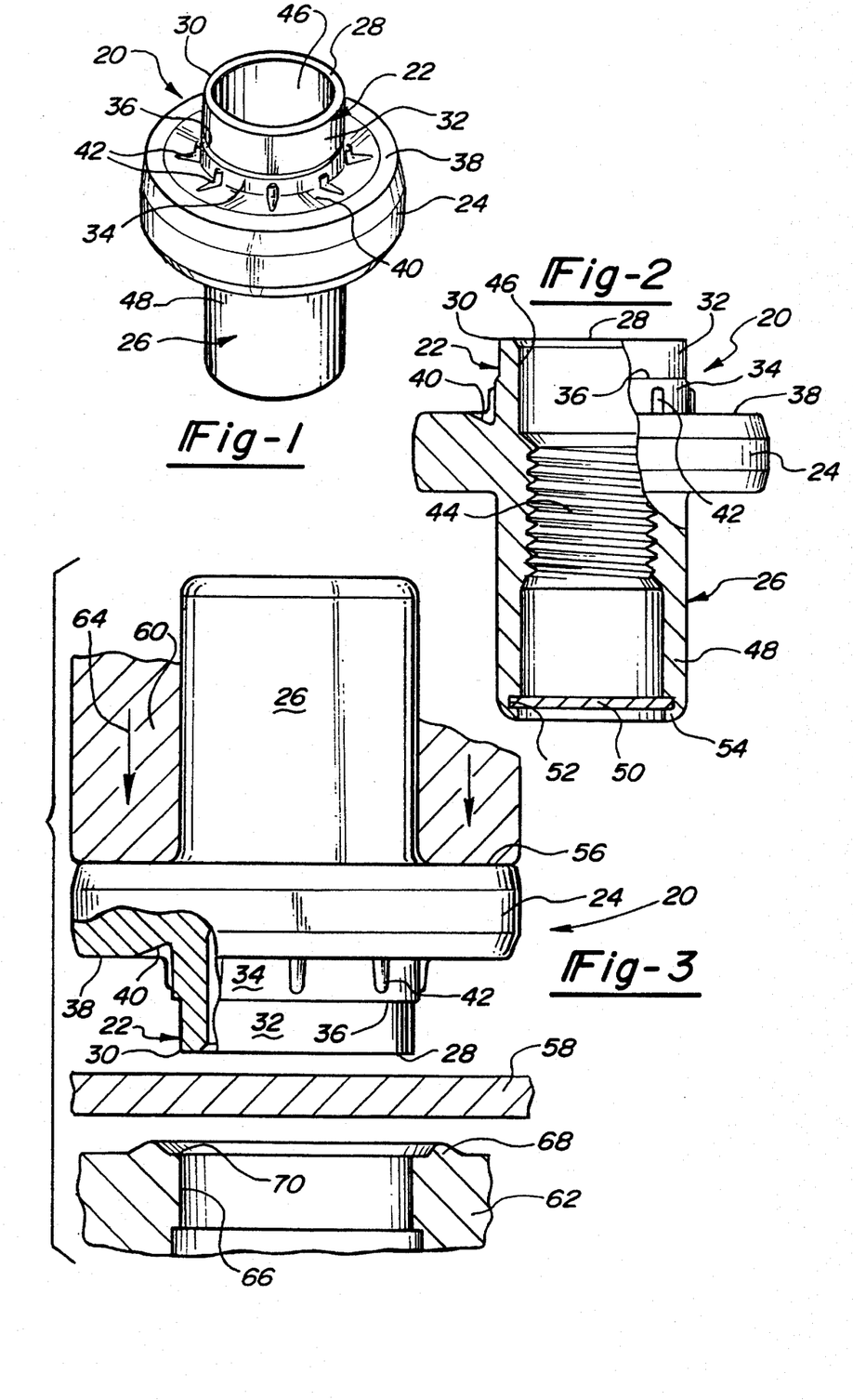
FIG. 1 is an end perspective view of an improved female fastener which may be utilized in the fastener and panel assembly and method of this invention.
FIG. 2 is a side partially cross-sectioned view of the female fastener shown in FIG. 1.
FIG. 3 is a side partially cross-sectioned view of the fastener shown in FIGS. 1 and 2 as the fastener is being installed in a first panel in a die press.

FIG. 1 and 2 illustrate a preferred embodiment of a fastener 20 which may be utilized in the fastener and panel assembly and method of installation of this invention in the form of a female fastener. The fastener 20 includes a barrel portion 22, which is preferably annular or tubular, a radial flange portion 24 adjacent the barrel portion 22, which extends generally perpendicular to the barrel portion, and a fastener portion 26 generally opposite the barrel portion 22. In a preferred embodiment, the free end 28 of the barrel portion is self-piercing, which is particularly advantageous in many mass production applications. In this preferred embodiment of the method of this invention, the radial outer edge 30 of the free end 28 of the barrel portion 22 is relatively sharp, as best show in FIG. 2, to pierce a slug from the panel having an inside diameter generally equal to the outside diameter 32 of the free end of the barrel portion as described below in regard to the method of this invention. Further, the outside diameter of the barrel portion at 32 adjacent the free end 28 is smaller than the outside diameter at 34 adjacent the flange portion 24 defining a radial shoulder 36, as best show in FIG. 1. Thus, as the barrel portion is driven into the opening pierced by the smaller diameter barrel portion 32 the larger diameter portion 34 provides an interference fit with the hole in the first panel, as described below.

The flange portion 24 includes an outer annular panel bearing surface 38 and an annular groove 40 adjacent the barrel portion 22 and surrounding the barrel portion. As best show in FIG. 2, the groove 40 is V-shaped having a bottom wall extending radially into the bearing surface 38 of the flange portion toward the barrel portion and an inside wall coincident with the outer surface 34 of the barrel portion. In the preferred embodiment, the groove includes a plurality of spaced radial ribs 42 which extend from the groove into the surface 34 of the larger diameter barrel portion, providing excellent torque resistance of the fastener in the panel assembly.

As described above, the disclosed embodiment of the fastener 20 is a female fastener having an internally threaded bore 44 which is preferably coaxially aligned with the internal surface 46 of the barrel portion. Where the female fastener is used with a self-tapping or thread rolling screw or bolt, the bore 44 will be unthreaded. Further, as described above, the fastener 20 may be a male fastener, wherein the fastener portion 26 may be solid and the free end may be threaded, for example, to provide a bolt fastener in the fastener and panel assembly of this invention. In the disclosed embodiment, the female fastener portion 26 includes a tubular portion 48 and a sealing cap or slug 50 which is retained in a slot 52 in the free end 54 of the tubular portion 48 and the free end 54 is deformed or coined over the cap 52 as shown in FIG. 2. A sealing cap 50 is provided in applications where foreign material must be kept out of the fastener assembly, such as automotive applications where the panel and fastener assembly is coated or where the fastener assembly is subjected to oil, dirt and road debris.

Figures 4, 7:
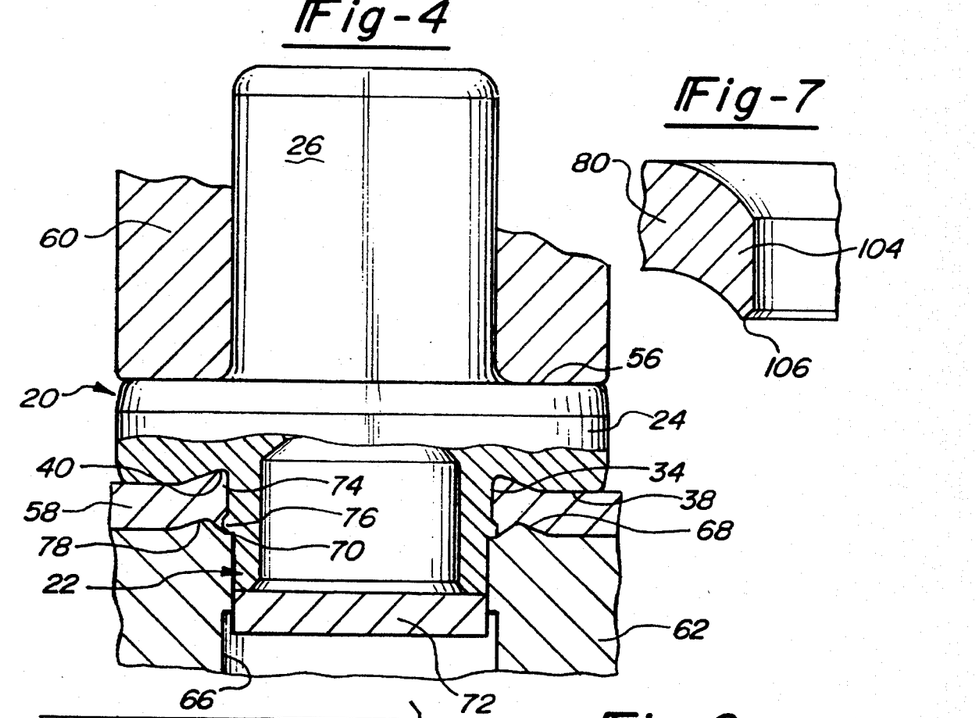
FIG. 4 is a side partially cross-sectioned view of the fastener and first panel assembly in a die press, similar to FIG. 3, after installation of the fastener in a first panel.
FIG. 7 is a partial side cross-sectional view of the opening formed in the second panel.

FIGS. 3 and 4 illustrate the installation of the fastener 20 in a first panel 58. In a typical application, the panel 58 is steel, such as low carbon, 1010 steel or high strength, low alloy steel (HSLA), and the fastener 20 is formed of a harder steel, such that the barrel portion 22 will pierce the steel panel 58. A suitable material for the fastener is a 35 carbon steel with boron, such as a 10 B35 or 35B2 wherein the nut may be heat treated to Class 10. The fastener 20 may be installed in a die press and the panel 58 may be preloaded by a conventional stripper plate (not shown). In the installation shown in FIGS. 3 and 4, the fastener 20 is received in a fastener installation head in the upper die shoe of a die press (not shown), which includes a reciprocating plunger 60 which bears against the driven surface 56 of the flange portion 24. A female die member or die button 62 is located in the lower die shoe assembly (not shown) and the free end 28 of the barrel portion 22 is driven against the first panel 58 by the plunger 60, as shown by arrows 64. The die button 62 includes a bore 66 which receives the panel slug and an annular spanking lip 68 which deforms the panel into the groove 40 as described below in regard to FIG. 4. The die button 62 further includes a relatively sharp piercing edge 70 adjacent the bore 66 which cooperates with the piercing edge 30 of the barrel portion 22 to pierce a slug from the panel, as now described.

In the method of this invention, the fastener 20 is first located by the installation head with the free end 28 of the barrel portion 22 located opposite the panel 58 coaxially aligned with the bore 66 of the die button 62 as shown in FIG. 3. The plunger 60 is then actuated to drive the free end 28 of the barrel portion 22 against the panel and the relatively sharp cutting or piercing edge 30 of the barrel portion 22 cooperates with the relatively sharp cutting or piercing edge 70 of the die button to pierce a slug 72 from the panel, as shown in FIG. 4. A V-shaped spanking lip 68 then deforms the panel portion 74 into the V-shaped groove 40 in the flange portion 24 and the outer annular bearing surface 38 is driven against the first panel 58 as shown in FIG. 4. In the most preferred embodiment of the method of this invention, the cutting edge 70 of the die button simultaneously deforms an annular rib 76 radially outwardly from the radial shoulder 36 of the barrel portion shown in FIGS. 1 to 3. The annular radial rib 76 is driven against the deformed portion 74 of the first panel, entrapping the panel in the groove 40 and forming a mechanical interlock between the first panel 58 and the fastener 20. The spanking lip 68 of the die button 62 further deforms a shallow V-shaped annular recess 78 in the first panel which receives the second panel, as described below. Further, the enlarged diameter portion 34 of the barrel portion is driven through the pierced panel opening, providing an interference fit, further improving the pull-out strength of the fastener from the first panel assembly.

As described above, it is preferable particularly in mass production applications, to securely retain the fastener to the first panel, prior to receipt of the second panel, as described below. In a typical mass production application, the fastener 20 may be attached to the first panel 58 at one station and the second panel may be attached to the assembly at a later station. The first panel and fastener assembly may be loaded in bins, for example, subjecting the assembly to pull-out and vibrational forces. Further, as described above, the fastener and panel assembly of this invention preferably provides an intimate matting contact between the panels and the fastener may be subject to substantial torque during attachment of a further element to the panel assembly, as described below. Thus, the fastener and first panel assembly is preferably mechanically interlocked to provide a secure installation prior to receipt of the second panel. In a typical application, the push-out strength of the fastener 20 in the first panel formed by the method of this invention is 8 Kn or greater. Further, the radial ribs 42 are driven into the panel portion 74 as the enlarged diameter portion 34 of the barrel portion is driven into the panel opening, providing excellent torque resistance for the panel assembly. The first panel 58 and fastener assembly is now ready for receipt of the second panel, as described below.

Figures 5, 6:
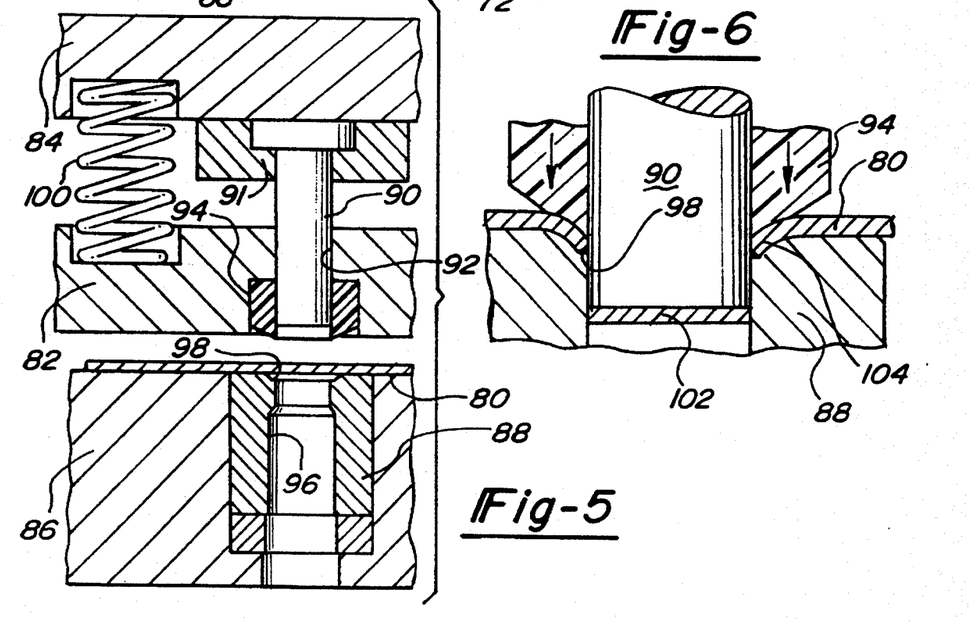
FIG. 5 is a side partially cross-sectioned side view of a die press assembly which may be used to form the second panel.
FIG. 6 is an enlarged side partially cross-sectioned view of the die press shown in FIG. 5 following piercing and forming of the second panel.

The second panel 80 is prepierced for receipt of the barrel portion 22 and is preferably deformed adjacent the opening to form a conical lip surrounding the opening, which may be formed by the apparatus shown in FIGS. 5 and 6. The upper die platen 82 is attached to the upper die shoe 84 of the die press by conventional means. The lower die platen 86 includes a die member or die button 88 anti a plunger 90 is attached to the upper die shoe by plate or bracket 91. The upper die platen includes a bore 92 which receives the plunger and an annular resilient bumper or bushing 94 is retained in a counter-bore in the bore 92. The die button 88 includes a central bore 96 which receives the plunger 90 and a die cavity 98 which forms the panel, as described below. The upper die shoe is spring biased by coil springs 100, normally separating the upper die platen 82 from the die shoe 84. When the upper die shoe 84 is lowered by the die press, the plunger 90 pierces a slug 102 from the panel, as shown in FIG. 6. Continued downward movement of the upper die shoe 84 compresses spring 100, which drives the resilient plastic bushing 94 against the surface of the panel surrounding the pierced opening, deforming the panel into a generally conical lip 104, as best shown in FIGS. 6 and 7. The conical lip 104 extends from the plane of the panel 80 and includes an annular lip 106 spaced from the plane of the panel 80. The resilient bumper 94 forms the panel into the desired shape in the die cavity 98, as best shown in FIG. 6. Further, details of this operation are disclosed in the above-referenced copending application. The second panel 80 is now ready for installation on the first panel and fastener assembly formed by the method disclosed in FIGS. 3 and 4, as described below in regard to FIGS. 8 and 9.

Figure 8:
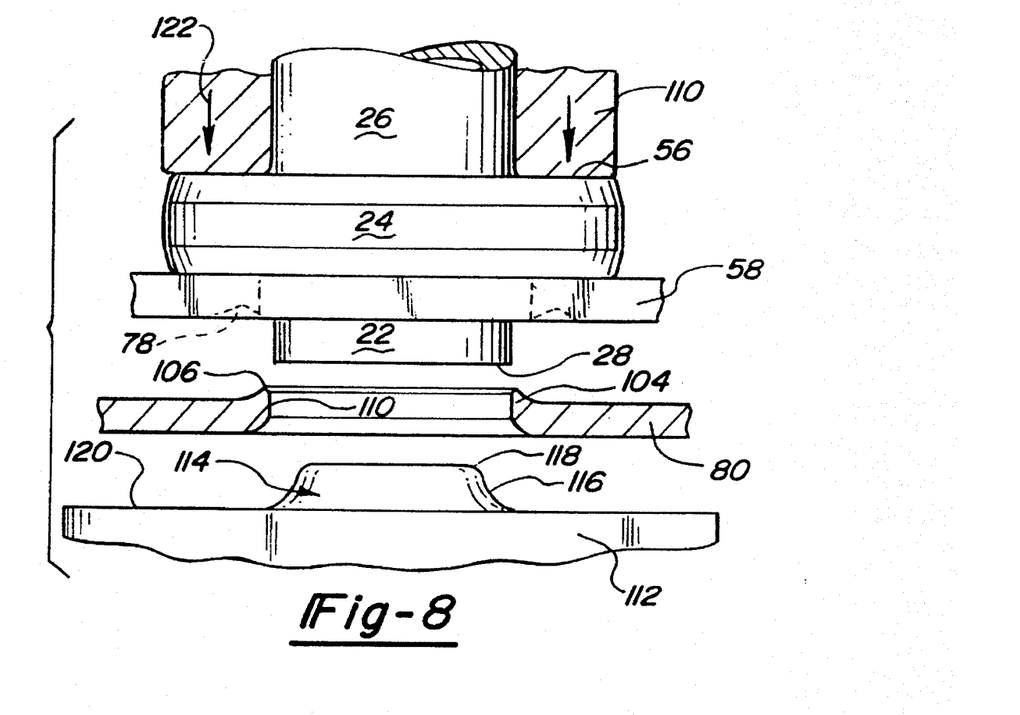
FIG. 8 is an exploded partially cross-sectioned side view of the first panel and fastener assembly show in FIG. 4 in a die assembly attaching a second panel formed as shown in FIGS. 5 and 6.

The installation apparatus includes an annular plunger 110 which is driven against the driven surface 56 of the flange portion 24 in an installation head (not shown). As described above in regard to the installation apparatus for installing the fastener in the first panel 58, the installation apparatus may be located in a conventional die press, such that the second panel 80 is attached to the fastener, with each stroke of the press. A die button 112 is located in the lower die platen which includes a central die post 114 configured to be received in the opening 110 formed in the second panel 80 as described above. FIG. 8 is an exploded view of the assembly for illustrational purposes. In a normal application, the panel 80 will be located on the upper surface 120 of the die button and retained by the stripper plate of the die press. The die post 114 includes a concave arcuate surface 116 which blends into the radial outer surface 118 of the die post.

As shown in FIG. 8, the second panel 80 is located in the die press with the annular edge 106 of the conical portion 104 of the second panel 80 facing the first panel 58. The opening 110 is configured to receive the barrel portion 22. When the plunger 110 is driven downwardly in FIG. 8, as shown by arrows 122, the internal surface 46 of the barrel portion is received against the concave surface 116 of the die post, deforming the free end 28 of the barrel portion radially outwardly over the edge 104 of the second panel 80. The panel is simultaneously flattened between the upper surface 120 of the die member and the first panel 58, which deforms the conical lip 104 radially inwardly against the outer surface of the barrel portion and into the V-shaped recess in the first panel. The second panel 80 is thus deformed against the first panel 58, forming an intimate matting face-to-face contact between the panels and the free end of the barrel portion is deformed radially outwardly into an arcuate hook-shape over the edge of the second panel surrounding the second panel opening in intimate matting contact, forming a secure mechanical interlock between the barrel portion 22 and the second panel 80. The resultant fastener and panel assembly has excellent push-through, pull-out and torque resistance. The push-out strength of the panel assembly is about 15 Kn or greater than about 3,000 lbs. The torque resistance in a typical application is about 120 newton meters.

Figure 10:
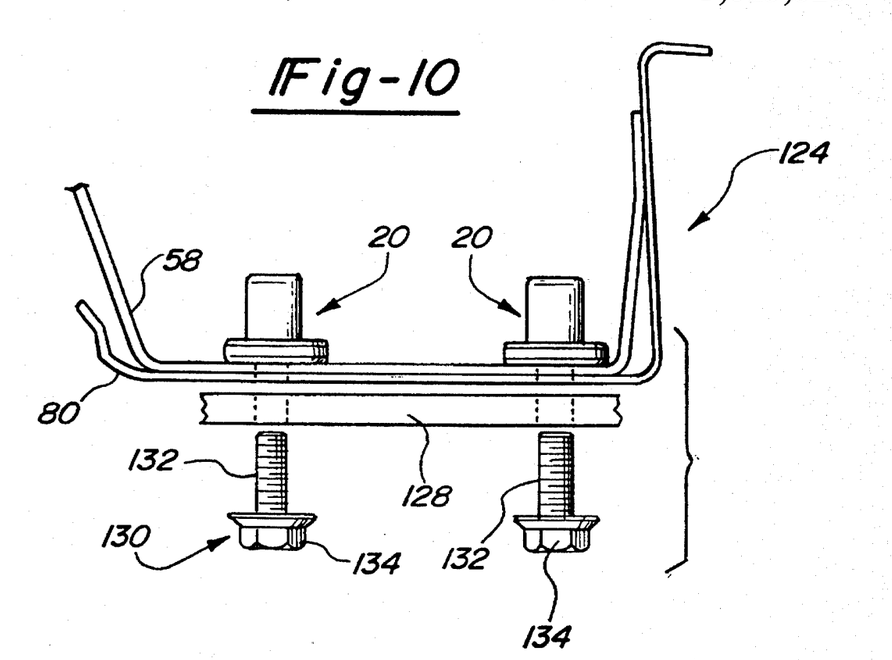
FIG. 10 is a side view of a typical installation of the fastener and panel assembly of this invention during attachment of a further element.
Figure 11:
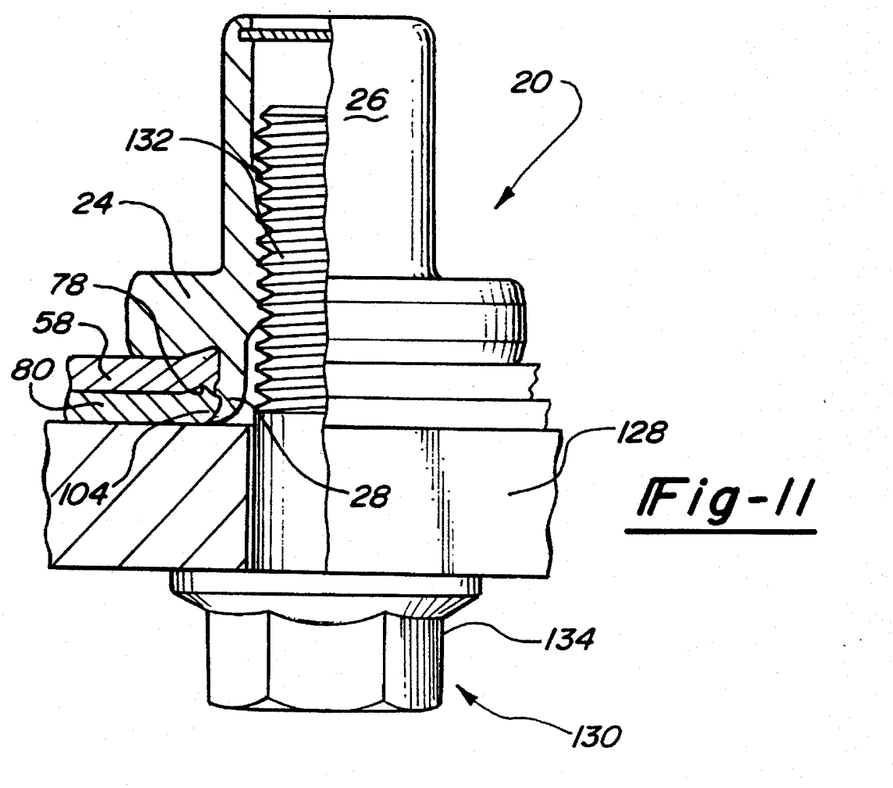
FIG. 11 is an enlarged side partially cross-sectioned view of the fastener and panel assembly shown in FIG. 10.

FIGS. 10 and 11 illustrate a typical application of the fastener and panel assembly of this invention. Two fasteners 20 are installed in a bracket assembly 124 which comprises panels 58 and 80 by the method and apparatus described above. Both fasteners may be installed in the panels 58 and 80 simultaneously in a die press, as described. The disclosed bracket assembly 124 may be attached to a vehicle frame (not shown), for example, and a structural element 128, such as an axle assembly, is then attached to the bracket assembly by bolts 130. As shown in FIG. 11, the threaded portion 132 of the bolt is received in the threaded bore 44 of the fastener 20 and the head 134 is driven against the structural element 128, securely retaining the structural element 128 to the bracket assembly 124. In a typical application, the bolt is driven into the nut fastener 20 by a torque wrench, subjecting the nut to substantial torque, particularly if the bolt is cross-threaded. Thus, substantial torque resistance of the fastener is required in many applications. In the most preferred embodiment, the free end 28 of the barrel portion is substantially flush with the second panel 80. Further tightening of the bolt 130, thus, actually requalifies the fastener and panel assembly by further deforming the free end of the barrel portion against the panel assembly. Further, as described above, the panels are in intimate face-to-face contact, preventing any debris from entering between the panels. Finally, the fastener and panel assembly has excellent torque resistance, push-through and pull-out resistance, providing a very secure assembly, particularly for applications subject to vibrational and other forces.

Figures 12, 13:
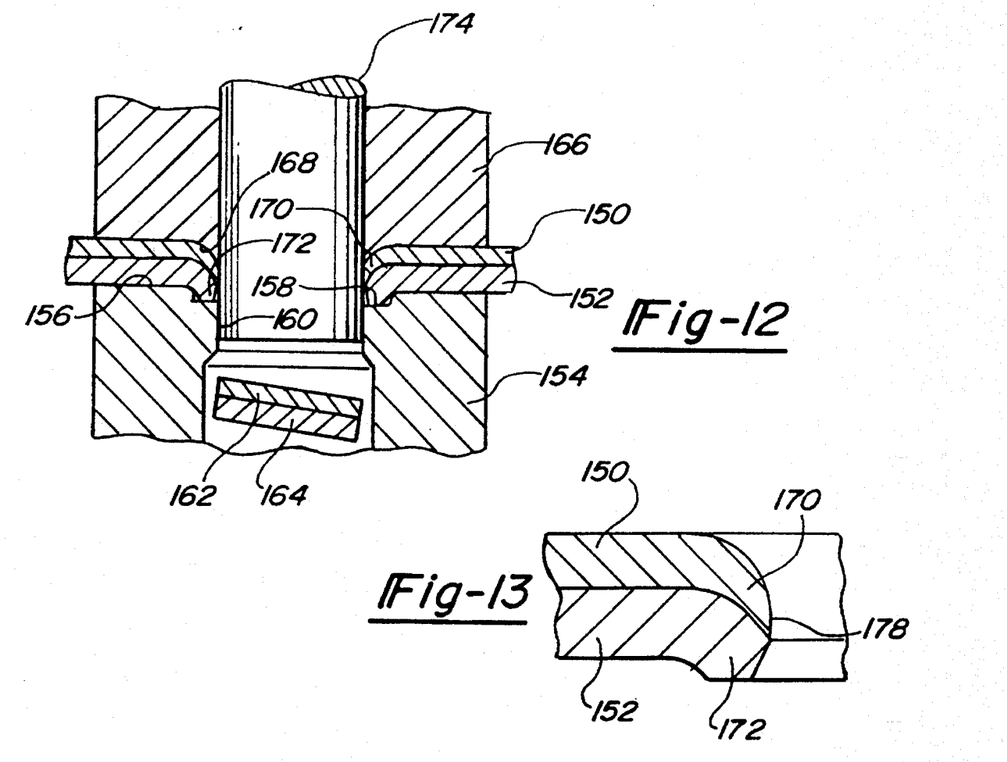
FIG. 12 is a side, partially cross-sectioned view, similar to FIG. 6, illustrating piercing and forming a plurality of panels in nested relation.
FIG. 13 is an enlarged view of the formed opening in the panels shown in FIG. 12.
Figure 14:
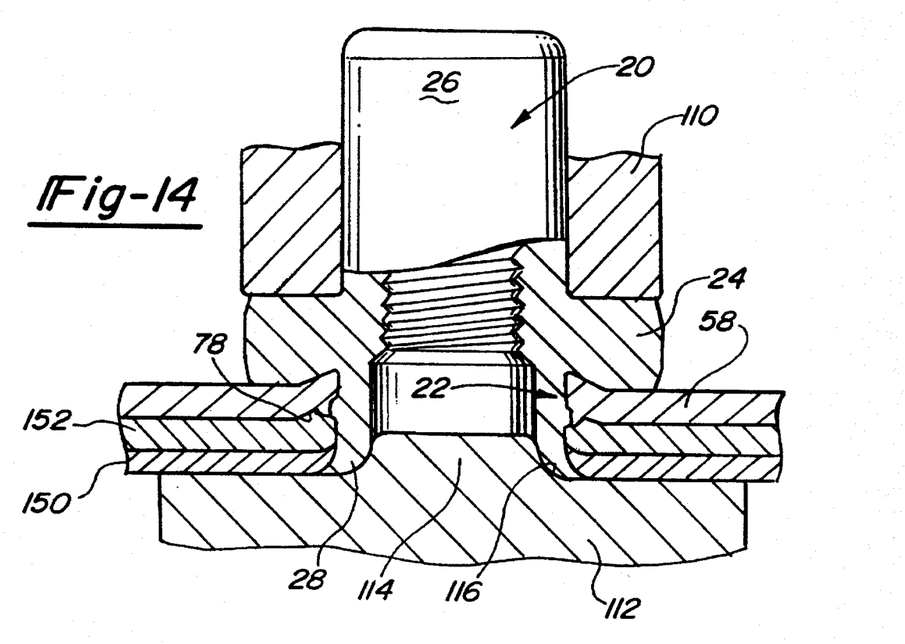
FIG. 14 is a side, partially cross-sectioned view, of a fastener and panel assembly, wherein the panels formed as shown in FIGS. 12 and 13 are attached to the fastener and the first panel assembly.

FIGS. 12 and 13 illustrate a method of simultaneously piercing and deforming a plurality of panels 150 and 152 in nested relation. The panels 150 and 152 are supported on an annular surface 156 of a die member 154 having an annular die cavity 158 and a central bore 160 which receives the pierced panel slugs 162 and 164, respectively. The male die member 166 includes an arcuate conical lip 168 which deforms the panel portions 170 and 172 into the annular die cavity 158 as the punch 174 is driven against the panels, piercing the panel slugs 162 and 164 and forming an arcuate panel opening 178, as shown in FIG. 13. The panel portion 150 is deformed into an arcuate generally frusto-conical lip 170 which blends into the conical lip 172 of panel 152. As described above, the panels 150 and 152 may be retained in face-to-face relation prior to piercing and forming, such as by spot welding, not shown. Further, the panels may first be pierced in a flat die, then deformed into the preferred nested frusto-conical shape as shown in FIG. 13 in two steps. Finally, as described above in regard to FIG. 10, a plurality of formed openings in the panels 150 and 152 may be formed for receipt of a plurality of fasteners 20. The nested panels 150 and 152 are now ready for attachment to the first panel and fastener assembly as shown in FIG. 14.

Figure 9:
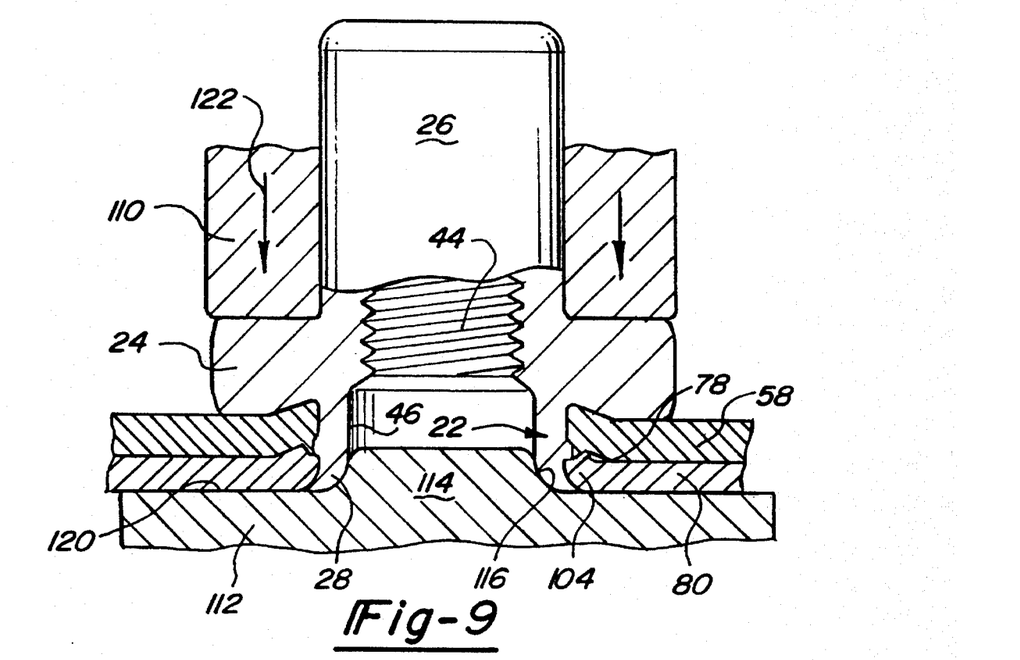
FIG. 9 is a partially cross-sectioned side view similar to FIG. 8 following installation of the fastener to the second panel.

As described above in regard to FIGS. 8 and 9, the first panel 58 may first be attached to the fastener 20 as described above in regard to FIGS. 3 and 4. The panels 150 and 152 are then reversed from the position shown in FIG. 13, such that the frusto-conical portions 170 and 172 bear against the first panel 58, and the annular plunger 110 is then driven against the flange portion 24 in an installation head (not shown), which may be located in a die press. The die button 112 includes a central die post 114 which is configured to receive the free end 28 of the barrel portion, deforming the barrel portion 28 radially outwardly against the concave surface 116 of the die post. The frusto-conical lips 170 and 172 of the panels 150 and 152, respectively, then are flattened by driving the panels against the first panel 58, driving the lips radially inwardly against the outer surface of the barrel portion and the panel 150 is deformed into the generally V-shaped recess 78 in the first panel, as described above. Thus, the method of this invention may be used to attach a plurality of panels to the fastener 20 as described herein. Finally, in certain applications, it may be desirable to attach fastener 20 directly to the panels 150 and 152, which are first pierced and formed as described above in regard to FIGS. 12 and 13; that is, the assembly may not include a first panel 58.

As will be understood by those skilled in the art, various modifications may be made to the fastener and panel assembly and method of this invention within the purview of the appended claims. For example, as described above, the fastener may be a male fastener having a threaded or unthreaded shank extending from the flange portion 24 at 26. Further, the fastener may be a more conventional nut fastener, rather than the enclosed nut fastener disclosed, by removing the tubular portion 48. The installation apparatuses disclosed herein are for illustrational purposes only and other apparatus may be utilized to install the fastener and form the fastener and panel assembly by the method of this invention. Further, although the fastener is preferably installed in a die press, the fastener may be installed upwardly, wherein the die buttons are located in the upper die shoe or die platen. Finally, as described above, the fastener and panel assembly may include three or more panels which may require extending the barrel portion 22 of the fastener. Where the "second" panel comprises two or more panels, the panels are preferably formed with an upstanding generally conical lip 104, as described above in regard to FIGS. 12 and 13. The panels may then be nested and installed simultaneously or sequentially. Having described the panel assembly and method of this invention, the inventions are now claimed, as set forth below.

I claim:

1. A fastener and panel assembly, including a plurality of plastically deformable panels permanently retained in face-to-face relation, comprising: a fastener including a barrel portion, a flange portion extending radially from adjacent said barrel portion generally perpendicular to said barrel portion and a fastener portion generally opposite said barrel portion, said flange portion having a groove adjacent said barrel portion generally surrounding said barrel portion, a first panel having an opening receiving said fastener barrel portion therethrough bearing against said flange portion and deformed in said flange portion groove and said first panel including an annular recess generally surrounding said fastener barrel portion, a second panel overlying said first panel having an opening receiving said barrel portion therethrough and deformed into said first panel annular recess, and said barrel portion having a free end deformed radially outwardly over said second panel permanently attaching said panels in face-to-face relation and said fastener portion extending from said second panel to attach another element to said panels.

2. The fastener and panel assembly defined in claim 1, characterized in that said groove in said flange portion is generally V-shaped extending radially inwardly toward said barrel portion, and said first panel is deformed into said V-shaped groove to substantially fill said flange portion groove.

3. The fastener and panel assembly defined in claim 2, characterized in that said first panel is deformed into said V-shaped groove in said flange portion forming a generally V-shaped annular recess in said first panel opposite said flange portion surrounding said barrel portion, and said second panel deformed in said annular recess in said first panel and radially inwardly against said barrel portion forming close face-to-face mating contact between said panels.

4. The fastener and panel assembly defined in claim 2, characterized in that said flange portion annular groove includes a plurality of radial ribs and said first panel deformed in said V-shaped groove of said flange portion around said radial ribs preventing rotation of said fastener relative to said panels.

5. The fastener and panel assembly defined in claim 1, characterized in that an outer surface of said barrel portion is deformed radially outwardly spaced from said free end to form a radial annular rib bearing against said first panel, entrapping said first panel in said flange portion groove.

6. The fastener and panel assembly defined in claim 1, characterized in that said barrel portion outer surface including a radial annular rib spaced from said free end bearing against said first panel and entrapping said first panel in said flange portion groove.

7. The fastener and panel assembly defined in claim 1, characterized in that said barrel portion includes a first portion adjacent said flange portion having an outside diameter greater than a second panel adjacent said free end.

8. The fastener and panel assembly defined in claim 1, characterized in that said barrel portion free end is deformed radially outwardly in an arcuate hook-shape over an edge of said second panel surrounding said second panel opening anti said second panel is deformed radially inwardly against said barrel portion forming an intimate mating contact between said second panel and said barrel portion.

9. A fastener and panel assembly, including a plurality of plastically deformable panels permanently retained in face-to-face relation, comprising: a fastener including a barrel portion, a flange portion extending radially from adjacent said barrel portion generally perpendicular to said barrel portion and a fastener portion generally opposite said barrel portion, said flange portion having a V-shaped annular groove extending radially inwardly toward said barrel portion generally surrounding said barrel portion, a first panel having an annular opening receiving said fastener barrel portion therethrough bearing against said flange portion and deformed in said generally V-shaped flange portion groove retained to said fastener, a second panel overlying said first panel having an opening receiving said barrel portion therethrough and said barrel portion having a free end deformed radially outwardly over said second panel permanently attaching said panels in face-to-face relation with said fastener portion extending from said first panel to attach another element to said panels.

10. The fastener and panel assembly defined in claim 9, characterized in that said first panel includes an annular generally V-shaped recess surrounding said fastener barrel portion spaced from said barrel portion and said second panel deformed in said first panel recess, substantially filling said first panel recess.

11. The fastener and panel assembly defined in claim 10, characterized in that said second panel is deformed radially inwardly against said barrel portion forming an intimate contact between said second panel and said barrel portion.

12. The fastener and panel assembly defined in claim 9, characterized in that said flange portion generally V-shaped annular groove includes a plurality of radial ribs and said first panel deformed in said V-shaped groove around said radial ribs preventing rotation of said fastener relative to said panels.

13. The fastener and panel assembly defined in claim 9, characterized in that said barrel portion outer surface includes a radial annular rib spaced from said free end bearing against said first panel and entrapping said first panel in said flange portion groove.

14. The fastener and panel assembly defined in claim 9, characterized in that said barrel portion annular rib is deformed radially outwardly from an outer surface of said barrel portion against said first panel, entrapping said first panel in said flange groove.

15. The fastener and panel assembly defined in claim 14, characterized in that said barrel portion includes a first portion adjacent said flange portion having an outside diameter greater than a second portion adjacent free end and said first panel deformed against said barrel portion second portion forming an intimate contact between said first panel and said barrel portion.

16. The fastener and panel assembly defined in claim 9, characterized in that said barrel portion free end is deformed radially outwardly in an arcuate hook-shape over an edge of said second panel surrounding said second panel opening and said second panel is deformed radially inwardly against said barrel portion forming an intimate mating contact between said second panel and said barrel portion.

17. A fastener and panel assembly, including a plurality of plastically deformable panels permanently retained in face-to-face relation by said fastener, comprising: a fastener including a tubular barrel portion, a flange portion extending radially from adjacent said barrel portion generally perpendicular to said barrel portion and a fastener portion, said flange portion including a generally V-shaped annular groove adjacent said barrel portion extending radially inwardly toward said barrel portion, a first panel having an opening receiving said fastener barrel portion therethrough bearing against said flange portion and deformed into said flange portion generally V-shaped annular groove retained to said fastener, said first panel including a generally V-shaped annular recess opposite said flange portion groove generally surrounding said barrel portion, a second panel overlying said first panel having an opening receiving said barrel portion therethrough deformed in said first panel annular recess, and said barrel portion having a free end deformed radially outwardly over and against said second panel permanently attaching said panels in face-to-face relation and said fastener portion extending from said first panel to attach another element to said panels.

18. The fastener and panel assembly defined in claim 17, characterized in that said flange portion generally V-shaped annular groove includes a plurality of radial ribs bridging said groove and said first panel deformed in said V-shaped groove around said radial ribs preventing rotation of said fastener relative to said panels.

19. The fastener and panel assembly defined in claim 17, characterized in that said barrel portion outer surface includes a radial annular rib spaced from said free end bearing against said first panel and entrapping said first panel in said barrel groove.

20. The fastener and panel assembly defined in claim 19, characterized in that said barrel portion annular rib is deformed in said barrel portion radially against said first panel entrapping said first panel in said flange portion groove.

21. The fastener and panel assembly defined in claim 17, characterized in that said barrel portion free end is deformed radially outwardly in an arcuate hook-shape over an edge of said second panel surrounding said second panel opening and said second panel is deformed radially inwardly against said barrel portion forming an intimate mating contact between said second panel and said barrel portion and securely retaining said fastener on said panels.

22. A fastener and panel assembly, including a plurality of plastically deformable panels permanently retained in face-to-face relation, comprising: a fastener including a barrel portion having a free end, a flange portion extending radially from adjacent said barrel portion generally perpendicular to said barrel portion and a fastener portion generally opposite said barrel portion, said flange portion having a groove adjacent said barrel portion generally surrounding said barrel portion, a first panel having an opening receiving said fastener barrel portion therethrough bearing against said flange portion and deformed in said flange portion groove, said barrel portion having an annular rib spaced from said barrel portion free end bearing against said first panel retaining said first panel to said fastener, a second panel overlying said first panel having an opening receiving said barrel portion therethrough, and said barrel portion having a free end deformed radially outwardly over said second panel permanently attaching said panels in face-to-face relation and said fastener portion extending from said second panel to a attach another element to said panels.

* * * * *